Patented July 14, 1931

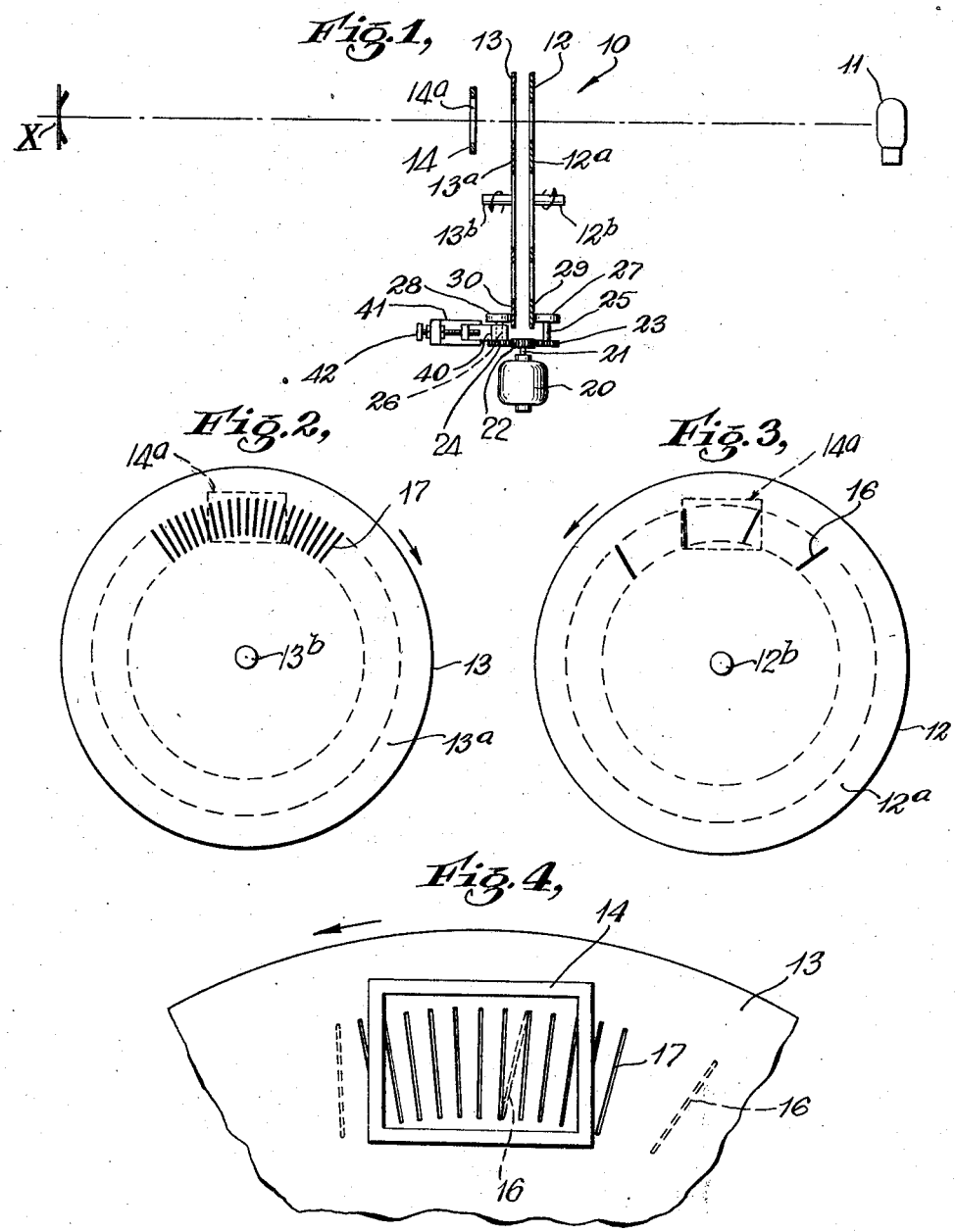

1,814,137

UNITED STATES PATENT OFFICE

JUDAH B. FELSHIN, OF NEW YORK, N. Y., ASSIGNOR OF ONE-THIRD TO MORRIS KIRSCHSTEIN AND ONE-THIRD TO LOUIS OSKOW, BOTH OF BROOKLYN, NEW YORK

TELEVISION

Application filed April 8, 1929. Serial No. 353,545.

This invention relates to television. It is directed to a scanning mechanism adapted for use in image transmitting systems.

An object of this invention is to provide improved mechanism of the character described whereby an increased number of scannings may be had with a very compact apparatus.

A further object of this invention is to provide in a scanning system employing a rotary disc, means for producing a plurality of scanning operations over the area to be scanned for each revolution of the disc.

A still further object of this invention is to provide a compact and rugged apparatus of the character described which shall be relatively inexpensive to manufacture and yet practical and efficient to a high degree in use.

Other objects of this invention will in part be obvious and in part hereinafter pointed out.

The invention accordingly consists in the features of construction, combinations of elements, and arrangements of parts which will be exemplified in the construction hereinafter described, and of which the scope of application will be indicated in the following claims.

In the accompanying drawing, in which is shown one of the various possible illustrative embodiments of this invention, Figure 1 is a plan view of scanning apparatus embodying the invention illustrating the general arrangement of the parts;

Fig. 2 is a side elevational view of the screen disc;

Fig. 3 is a side elevational view of the shutter disc; and

Fig. 4 is an enlarged fragmentary view of the screen disc with the superimposed shutter openings shown in dotted lines.

Referring in detail to the drawing, 10 designates scanning mechanism embodying the invention. The present invention relates to television systems wherein the scanning mechanism at each of the sending and receiving stations is operated by synchronized actuating means to provide for simultaneous scanning of the objects or images transmitted. For the purpose of illustration, Fig. 1 shows a part of the sending station, it being understood that the essential elements of the scanning mechanism at the receiving station is substantially the same and synchronized therewith in the usual manner.

The scanning mechanism 10 generally comprises, a light source 11, aligned or superimposed shutter and screen members 12 and 13, respectively, and a frame window 14.

Said shutter member 12 comprises a thin annular disc 12a fixed to a central shaft 12b extending from one side of said disc and mounted for rotation in any suitable bearing (not shown). Formed in said disc 12a are a number of equiangularly spaced, similar, narrow shutter openings or slits 16. All of said slits 16 are somewhat inclined to a radial line intersecting the same, each of said slits being similarly inclined. In other words, all of said slits are tangent to a circle, the center of which is on the axis of the disc 12a. The inner and outer ends of each of said slits are on concentric circles as shown by the dotted lines of Fig. 3. The spacing of the shutter slits is preferably determined by the width of the window opening 14a in frame 14 so that as the disc 12a rotates, one slit will come into overlapping relation with said opening as the next preceding slit passes beyond said opening. However, all of said slits 16 are preferably equiangularly spaced so that their positions relative to window opening 14a may vary uniformly as the shutter disc 12a rotates.

The screen member 13 as shown in the drawing is in the form of a disc 13a fixed on a shaft 13b coaxial with shaft 12b and likewise mounted for rotation in any suitable bearing member. Said disc 13a is formed with a plurality of relatively closely spaced, radial, narrow slits or openings 17, preferably annularly arranged so that the slitted portion extends entirely around the disc 13a. As shown in Fig. 2, the outer and inner ends of said slits lie in concentric circles of the same radii as the concentric circles bounding the shutter slits 16 of disc 12a. Thus, during rotation of either of discs 12a or 13a, the slits 16 and 17 will travel in aligned, superimposed circular paths. Preferably the inclination of each of the slits 16 is such that the upper and lower ends thereof are aligned with the upper end of one slit 17 and the lower end of the next adjacent slit 17 respectively.

For rotating said discs 12a, 13a in opposite directions, an electric motor 20 is provided having an axial shaft 21 on which a gear 22 is fixed. Meshed to said gear 22 on opposite sides thereof are gears 23, 24, connected thru shafts 25, 26 to friction wheels 27, 28 respectively. Said shafts 25, 26 may be supported for rotation in any suitable manner. Said friction wheels 27, 28 contact outer faces 29, 30 of discs 12a, 13a respectively for frictionally driving said discs in opposite directions.

Means is provided for breaking the driving connection between motor 20 and the screen 13a, to prevent rotation of the latter. To this end, the bearing member 40 for shaft 26 is slidably mounted on the block 41. Any suitable handle means 42 attached to block 41 may be provided for sliding the bearing 40 to disengage the gear 24 and wheel 28 from gear 22 and disc 13a, respectively. The screen disc 13a may thus be made stationary.

The operation of the device with the screen disc 13a stationary and the shutter disc 12a rotating will now be described. In such case only the slitted portion of disc 13a which is bounded by the frame 14, is utilized.

The light from lamp 11 is projected, by any suitable means, toward the discs 12a, 13a. However, only rays passing thru overlapping or superimposed portions of the shutter and screen slits 16, 17 can pass thru frame opening 14a and reach and illuminate the object X to be scanned. During rotation of the disc 13a, the overlapping portions of the shutter and screen slits at any one instant (which is the small area where the inclined shutter 16 slit cuts or crosses the radial screen slits 17), moves radially in successive lines in the same direction, depending upon the direction of rotation of the shutter disc relative to the screen disc. Since the slit 16 cannot at any instant overlap portions of two adjacent slits 17, the penetrating beam of light travels along the entire length of one slit 17 and then starts at the opposite end of the next adjacent slit 17. With the disc 12a rotating in a counterclockwise direction as seen in Fig. 4, and each slit 16 so inclined that the bottom end thereof is further to the left than the top portion thereof, the overlapping area will move radially from the bottom to the top and thus the penetrating beam will move in successively adjacent radial lines and the illuminated spot on object X will also traverse said object radially from bottom to top in successive lines. The scanning of said object X is repeated when one slit 16 passes beyond said frame 14 and the next slit 16 comes into overlapping relation thereto. Thus as many scannings occur for each revolution of disc 12a as there are slits 16 in said disc. The transmission of the image of said object X by use of photo-electric cells and other apparatus well known in the art, (not shown) may then be carried out in the usual manner.

When said screen disc 13a is rotated in a direction opposite to the direction of rotation of disc 12a, the speed of movement of the radially moving beam is doubled and thus twice as many successive lines of light traverse the object X during each scanning operation (the lines being more closely spaced) than when disc 13a was stationary. Due to this construction, more definite images may be transmitted and a smaller disc than the discs now in use wherein only one scanning operation occurs for each revolution of the disc may be used, thus making for a more compact and accurate apparatus.

It will thus be seen that there is provided a device in which the several objects of this invention are achieved, and which is well adapted to meet the conditions of practical use.

As various possible embodiments might be made of the above invention, and as various changes might be made in the embodiment set forth, it is to be understood that all matter herein set forth or shown in the accompanying drawing is to be interpreted as illustrative and not in a limiting sense.

Having thus described my invention I claim as new and desire to secure by Letters Patent:

1. In a scanning device, a rotatably mounted member, means for rotating said member, and means associated with said member for scanning a predetermined area a plurality of times during each revolution of said member said last mentioned means comprising a member having a plurality of narrow elongated openings.

2. A scanning device comprising a member having a plurality of relatively closely spaced elongated openings and a rotatable member having a plurality of relatively widely spaced narrow openings adapted to overlap said first mentioned openings during rotation of said last mentioned member.

3. A scanning device comprising a member having a plurality of closely spaced, elongated openings adapted to cover a predetermined area, and a rotatable member parallel thereto and having a plurality of narrow elongated openings adapted to overlap said first mentioned openings during rotation of said rotatable member, said last mentioned openings being spaced substantially the width of said area.

4. A scanning device comprising a member having a plurality of relatively closely spaced, elongated openings and a rotatable member parallel thereto, and having a plurality of relatively widely spaced narrow elongated openings adapted to overlap said first mentioned openings during rotation of said rotatable member, said last named openings being obliquely disposed relative to said first named openings.

5. In a scanning device of the character described, a pair of parallel discs and means for coaxially rotating said discs in opposite directions, one of said discs having a plurality of relatively closely spaced radial slits, the slitted portion of said disc extending annularly around said disc, said other disc having a plurality of widely spaced non-radial slits adapted to traverse a circular path aligned with said annular slitted portion.

6. In a scanning device of the character described, a pair of parallel discs and means for coaxially rotating said discs in opposite directions one of said discs having a plurality of relatively closely spaced radial slits, the slitted portion of said disc extending annularly around said disc, said other disc having a plurality of relatively widely spaced non-radial slits adapted to traverse a circular path aligned with said annular slitted portion, said non-radial slits being equiangularly spaced from one another.

7. In a scanning device of the character described, a pair of parallel discs, means for rotating said discs in opposite directions on a common axis, and said discs being provided with means for scanning a predetermined area a plurality of times during each revolution of said discs.

8. In a scanning device, a plate member having a plurality of closely spaced slits adapted to cover a predetermined area to be scanned and a second plate member parallel to said first named member and rotatable relatively thereto, said second member having a plurality of slits equiangularly spaced from one another adapted to traverse said first named slits, said second mentioned slits being spaced apart substantially the width of said area.

9. In a scanning device of the character described, a pair of coaxial parallel discs, each having a plurality of spaced elongated narrow openings arranged in annular aligned paths, one of said discs having fewer openings than said other disc.

10. In a scanning device of the character described, a pair of coaxial parallel discs, each having a plurality of spaced, elongated, narrow openings arranged in annular aligned paths, one of said discs having fewer openings than said other disc, the openings in each disc being uniformly spaced.

11. In a scanning device of the character described, a pair of coaxial parallel discs, each having a plurality of spaced, elongated narrow openings arranged in annular aligned paths, one of said discs having fewer openings than said other disc, the openings in each disc being uniformly spaced, the openings of one of said discs being disposed obliquely to the openings of said other disc.

In testimony whereof I affix my signature.
JUDAH B. FELSHIN.